United States Patent
Chen

(10) Patent No.: US 8,089,460 B2
(45) Date of Patent: Jan. 3, 2012

(54) METHOD OF CONTROLLING A JOYSTICK AND PREVENTING THE JOYSTICK FROM ENABLING UNWANTED EVENTS

(75) Inventor: Wo-Chin Chen, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 1035 days.

(21) Appl. No.: 11/937,483

(22) Filed: Nov. 8, 2007

(65) Prior Publication Data

US 2008/0170036 A1 Jul. 17, 2008

(30) Foreign Application Priority Data

Jan. 17, 2007 (TW) .............................. 96101730 A

(51) Int. Cl.
*G06F 3/033* (2006.01)
*G09G 5/08* (2006.01)
(52) U.S. Cl. ........... 345/161; 345/157; 345/160; 463/36
(58) Field of Classification Search .......... 345/156–158, 345/160–161; 463/36–39
See application file for complete search history.

(56) References Cited

U.S. PATENT DOCUMENTS

| 7,600,064 | B2 * | 10/2009 | Knowles et al. ............... 710/240 |
| 2001/0055195 | A1 | 12/2001 | Suzuki | |
| 2006/0010395 | A1 * | 1/2006 | Aaltonen ....................... 715/779 |
| 2006/0139328 | A1 * | 6/2006 | Maki et al. .................... 345/161 |

FOREIGN PATENT DOCUMENTS

| EP | 1 571 538 A1 | 9/2005 |
| TW | 507157 | 10/2002 |

\* cited by examiner

*Primary Examiner* — Kimnhung Nguyen
(74) *Attorney, Agent, or Firm* — Winston Hsu; Scott Margo

(57) ABSTRACT

When a directional event is triggered, enable the directional event and start to time a first time period, and disable any select event triggered within the first time period. When a select event is triggered, start to time a second time period. If a directional event is triggered within the second time period, disable the select event and enable the directional event. If no directional event is triggered within the second time period, enable the select event. Thus the false trigger of a select event would not enable an unwanted event.

6 Claims, 6 Drawing Sheets

METHOD OF CONTROLLING A JOYSTICK AND PREVENTING THE JOYSTICK FROM ENABLING UNWANTED EVENTS

BACKGROUND OF THE INVENTION

1. Field of the Invention

The present invention relates to a method of controlling a joystick, and more particularly, to a method of controlling a joystick and preventing the joystick from enabling unwanted events.

2. Description of the Prior Art

A consumer electronic product such as a mobile communications apparatus, personal data assistant, vehicle navigator, MP3 walkman, and hand-held computer is commonly equipped with a joystick to switch pictures on a screen, scroll the pictures, and select items. Particularly in a mobile phone, a joystick has become a basic input device. The joystick on the mobile phone is commonly installed on a concave portion of the housing of the mobile phone so that the joystick does not protrude above the remaining portion of the housing of the mobile phone. But it makes a user difficult to manipulate the joystick and sometimes causes the user to mistakenly trigger unwanted events.

Please refer to FIG. 1. FIG. 1 is a front view of a prior art mobile phone 100. The mobile phone 100 comprises an antenna 101, a joystick 110, a direction indicator 120, a speaker 130, a screen 140, a microphone 150, and a plurality of input buttons 160. The joystick 110 is a five way joystick for triggering five different events including four directional events and a select event. The four directional events include an upward event, downward event, leftward event, and rightward event. The select event is triggered by depressing the joystick. Please refer to FIG. 2. FIG. 2 is a cross-sectional view along line 2-2' of the mobile phone 100 in FIG. 1. As shown in FIG. 2, the joystick 110 is installed on a concave portion 201 of the housing of the mobile phone 100 so that the joystick 110 does not protrude above the remaining portion of the housing of the mobile phone 100. But it makes a user difficult to manipulate the joystick and sometimes causes the user to mistakenly trigger an unwanted event.

For a two way or four way joystick, triggering an unwanted event is unlikely to occur because the joystick cannot be depressed to trigger an event. However a five way joystick is the most common design, thus if the joystick 110 is not properly disposed, particularly if the joystick 110 has a soft structure and provides no hedge against an unwanted event, then the joystick 110 may be easily accidentally depressed to trigger an unwanted event such as sending a confidential message to a third party.

Therefore, as long as a joystick can be depressed, even if the joystick is only three way capable of triggering two directional events and one select event, particularly if the joystick has a soft structure and provides no protection to prevent unwanted events, the joystick is likely to be depressed mistakenly.

To avoid triggering an unwanted event, other prior art uses a stiffer joystick instead. But a stiff joystick is unpleasant to use because a user has to push or depress strenuously to trigger an event. Eventually, this may cause the user's finger to experience pathological changes. And the stiffness of the joystick may deteriorate to behave like a soft joystick. Thus the problem of triggering an unwanted event is not solved.

SUMMARY OF THE INVENTION

According to an embodiment of the present invention, a method for controlling a joystick comprises when a first directional event is triggered, enabling the first directional event and starting to time a time period, and disabling any select event triggered within the time period.

According to another embodiment of the present invention, a method for controlling a joystick comprises when a first select event is triggered, starting to time a time period, and disabling the first select event and enabling a directional event if the directional event is triggered within the time period.

According to another embodiment of the present invention, a method for controlling a joystick comprises when a first select event is triggered, starting to time a time period, and enabling the first select event if no directional event is triggered within the time period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
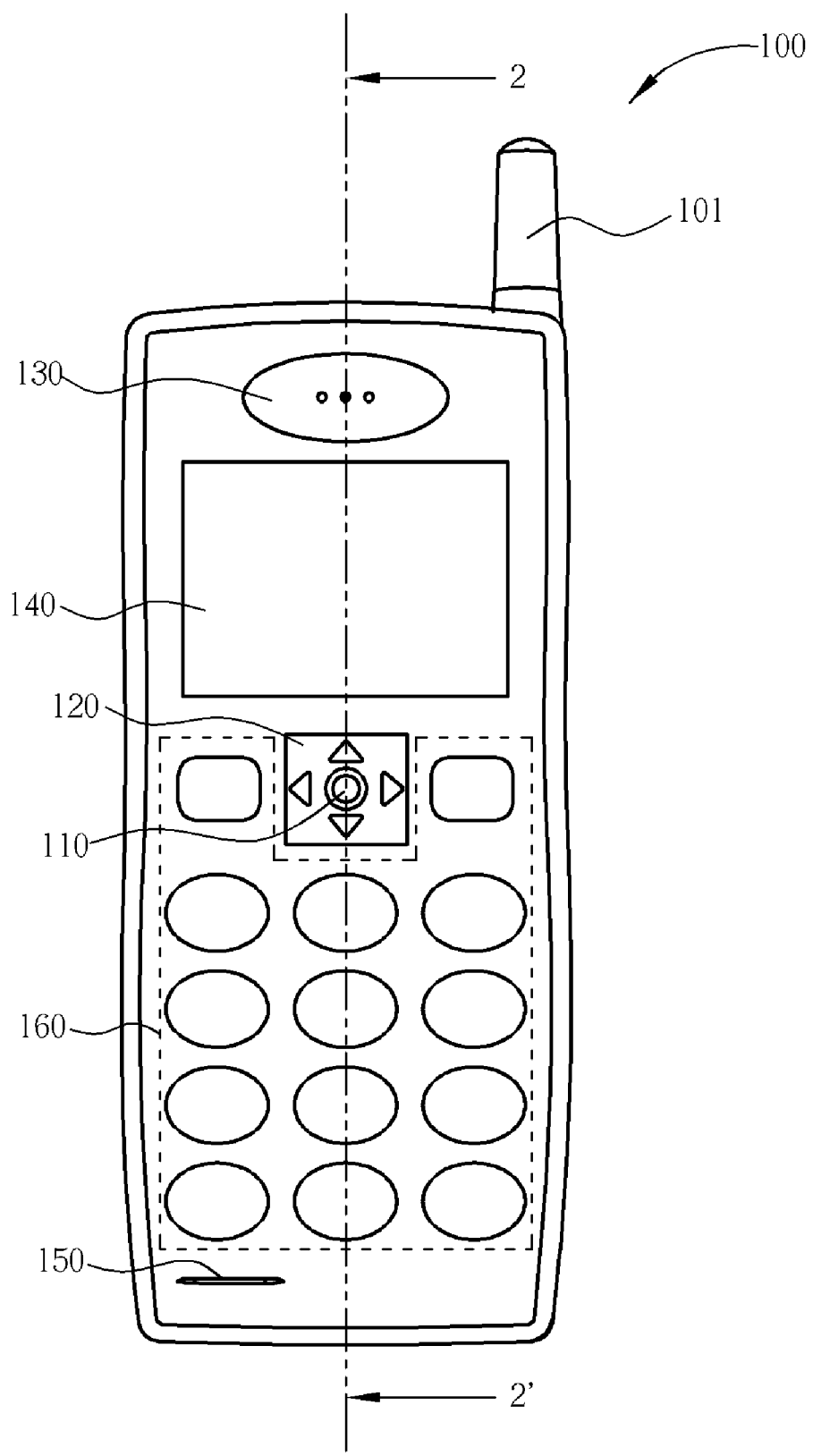
FIG. 1 is a front view of a prior art mobile phone 100.
Figure 2:
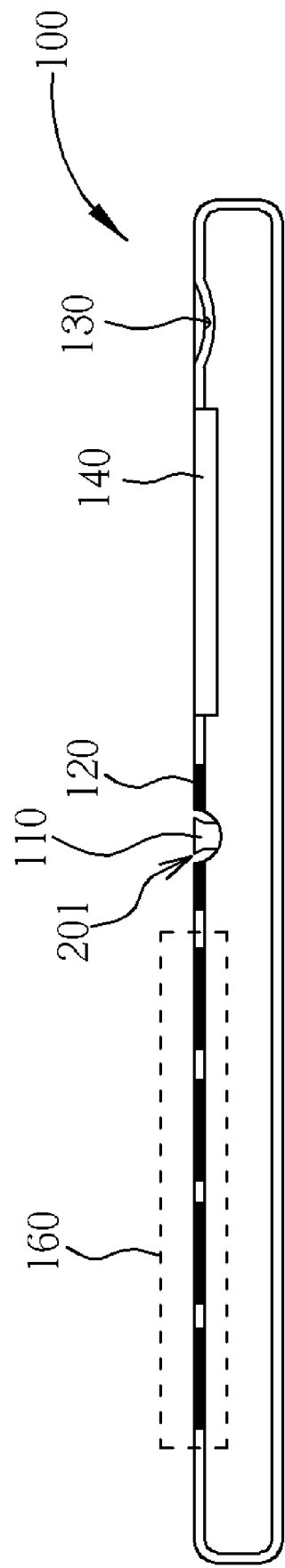
FIG. 2 is a cross-sectional view along line 2-2' of the mobile phone in FIG. 1.
Figure 3:
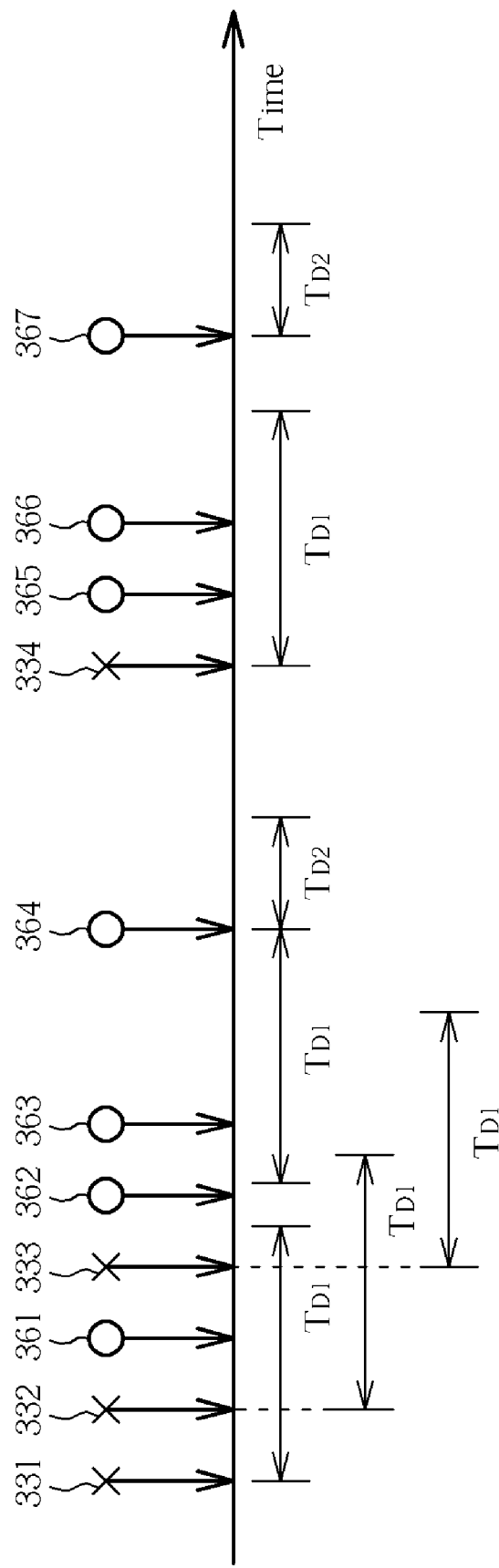
FIG. 3 is an operation sequence of a joystick according to a first embodiment of the present invention.

Please refer to FIG. 3. FIG. 3 is an operation sequence of the joystick 110 according to a first embodiment of the present invention. The horizontal axis refers to time. The joystick 110 is pushed to trigger directional events 331, 332, 333, 334, and is depressed to trigger select events 361, 362, 363, 364, 365, 366, 367.

After a directional event 331 is triggered, within a first time period $T_{D1}$, triggered select events would be disabled. Since the select event 361 is within the first time period $T_{D1}$, the select event 361 is disabled. Likewise the select events 362, 363, 365, 366 are disabled because they are triggered within a first time period $T_{D1}$ after the directional events 332, 333, 334 are triggered. The select event 364 is enabled because no directional event is triggered within a first time period $T_{D1}$ before the select event 364 is triggered, and no directional event is triggered within a second time period $T_{D2}$ after the select event 364 is triggered. Similarly the select event 367 is enabled.

Figure 4:
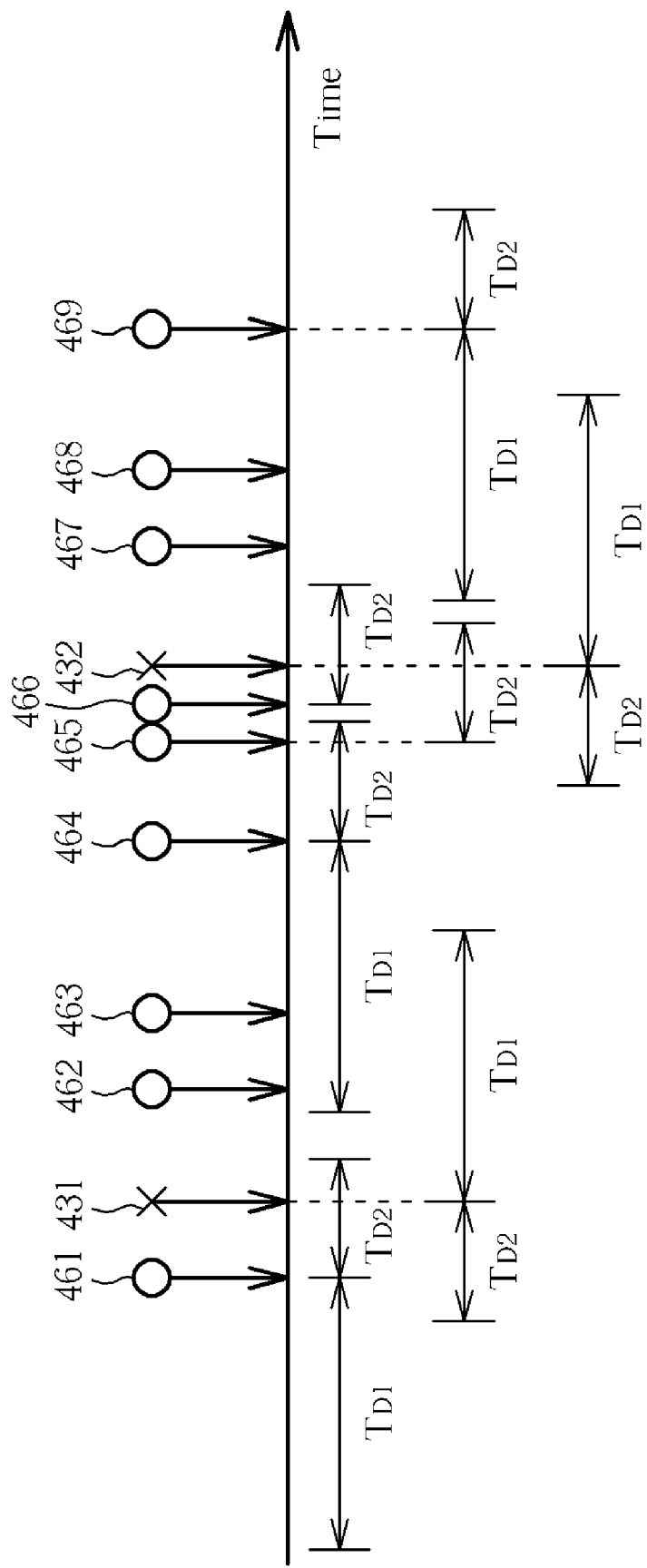
FIG. 4 is an operation sequence of a joystick according to a second embodiment of the present invention.

Please refer to FIG. 4. FIG. 4 is an operation sequence of the joystick 110 according to a second embodiment of the present invention. The horizontal axis refers to time. The joystick 110 is pushed to trigger directional events 431, 432 and is depressed to trigger select events 461, 462, 463, 464, 465, 466, 467, 468, 469.

When the select event 461 is triggered, though no directional event is triggered within a first time period $T_{D1}$ before the select event 461 is triggered, the select event 461 is stilled disabled because the directional event 431 is triggered within a second time period $T_{D2}$ after the select event 461 is triggered. The directional event 431 will be enabled as well as disabling the select event 461 triggered within a second time period $T_{D2}$ before the directional event 431 is triggered and disabling the select events 462, 463 triggered within a first time period $T_{D1}$ after the directional event 431 is triggered. That is, when the directional event 431 is triggered, the directional event 431 will disable select events triggered within a second time period $T_{D2}$ before the directional event 431 is triggered and disable select events triggered within a first time period $T_{D1}$ after the directional event 431 is triggered. Thus the select events 461, 462, 463 are disabled. Likewise the enabling of the directional event 432 disables the select events 465, 466 triggered within a second time period $T_{D2}$ before the directional event 432 is triggered and disables select events 467, 468 triggered within a first time period $T_{D1}$ after the directional event 432 is triggered.

The select events 464, 469 can be enabled because no directional event is triggered within a second time period $T_{D2}$ after the select event 464, 469 is triggered and no directional event is triggered within a first time period $T_{D1}$ before the select event 464, 469 is triggered.

Thus the triggering of a directional event will enable the directional event as well as disable select events triggered within a second time period before the directional event is triggered and disable select events triggered within a first time period after the directional event is triggered. In other words, a select event will be disabled if a directional event is triggered within a first time period before the select event is triggered. If no directional event is triggered within a first time period before the select event is triggered, the select event will be held back from being enabled until no directional event is triggered within a second time period after the select event is triggered. If a directional event is triggered within a second time period after the select event is triggered, then the select event will be disabled.

Figure 5:
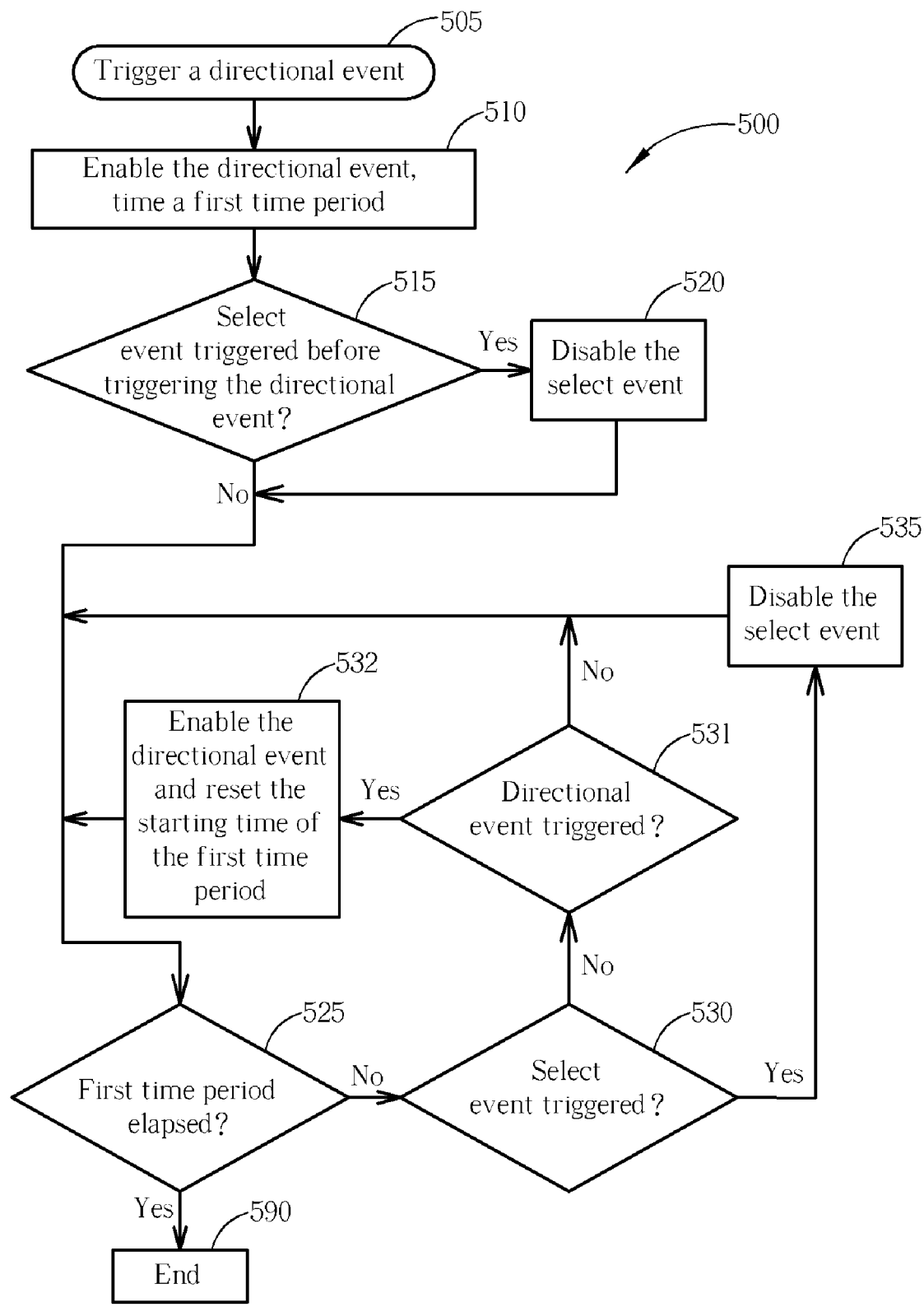
FIG. 5 is a flowchart of a first embodiment of a control procedure of a joystick according to the present invention.

To more clearly describe the control of the joystick 110, please refer to FIG. 5. FIG. 5 is a flowchart of an embodiment of a control procedure 500 of the joystick 110. The control procedure 500 comprises the following steps but not confined by the following steps:

Step 505: trigger a directional event;
Step 510: enable the directional event, and start to time a first time period;
Step 515: check if any select event has been triggered within a second time period before the directional event is triggered; if so, go to step 520; if not, go to step 525;
Step 520: disable select events triggered within the second time period before the directional event is triggered, go to step 525;
Step 525: check if the first time period has elapsed; if so, go to step 590; if not, go to step 530;
Step 530: check if any select event has been triggered; if so, go to step 535; if not, go to step 531;
Step 531: check if any directional event has been triggered; if so, go to step 532; if not, go to step 525;
Step 532: enable the directional event and reset the starting time of the first time period; go to step 525;
Step 535: disable the select event triggered within the first time period; go to step 525; and
Step 590: end of the control procedure of the directional event triggered in step 505.

In the above control procedure 500, the process of timing the first time period in step 510, 532 can be performed by forward timing or backward timing. Please refer to FIG. 3 again. Within a first time period after the directional event 331 is triggered, another directional event 332 is triggered, thus the first time period is reset. Afterwards, another directional event 333 is triggered within the first time period after the directional event 332 is triggered, thus the first time period is reset again. In another embodiment of the present invention, after the directional event 332, 333 is triggered, a first time period can be timed without terminating the timing of the first time period triggered by the directional event 331. This will not affect the outcome of the control of the joystick 110 other than complicating the timing control of the joystick 110.

In another embodiment of the present invention, the second time period in steps 515, 520 can be zero. That is, a directional event only disables select events triggered within a first time period after the directional event is triggered, but does not disable select events triggered within a second time period before the directional event is triggered. In this case, steps 515, 520 can be eliminated. Therefore, it is within the scope of the present invention as long as select events triggered within a first time period after a directional event is triggered are disabled. Whether select events triggered within a second time period before the directional event is triggered are disabled or not does not affect the scope of the present invention.

Figure 6:
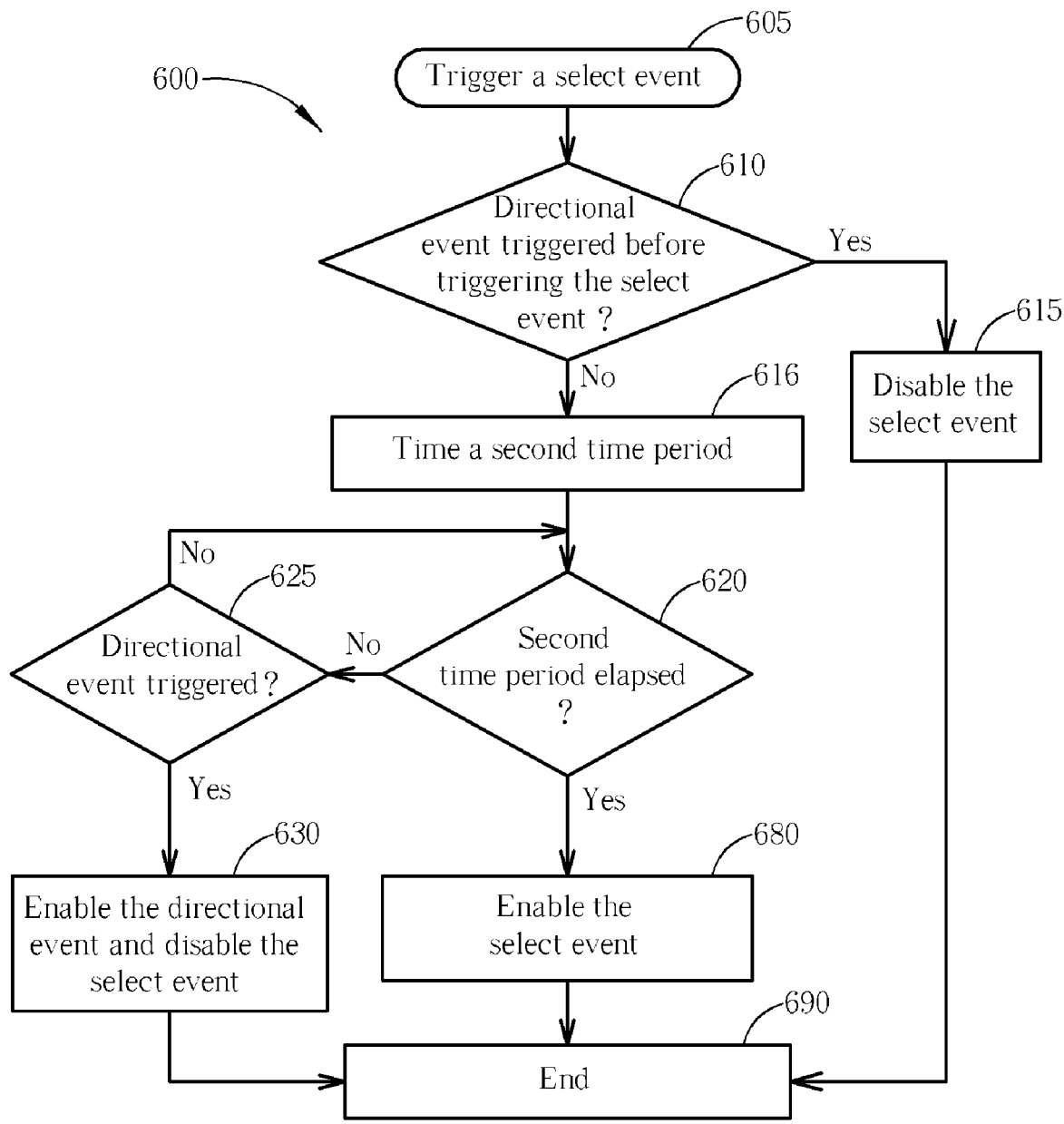
FIG. 6 is a flowchart of a second embodiment of a control procedure of a joystick according to the present invention.

Please refer to FIG. 6. FIG. 6 is a flowchart of an embodiment of another control procedure 600 of the joystick 110. The control procedure 600 comprises the following steps but not confined by the following steps:

Step 605: trigger a select event;
Step 610: check if any directional event has been triggered within a first time period before the select event is triggered; if so, go to step 615; if not, go to step 616;
Step 615: disable the select event, go to step 690;
Step 616: start to time a second time period, go to step 620;
Step 620: check if the second time period has elapsed; if so, go to step 680; if not, go to step 625;
Step 625: check if any directional event has been triggered; if so, go to step 630; if not, go to step 620;
Step 630: enable the directional event and disable the select event, go to step 690;
Step 680: enable the select event; and
Step 690: end of the control procedure of the select event triggered in step 605.

In the above control procedure 600, the process of timing the second time period in step 616 can be performed by forward timing or backward timing. If within the second time period, a second select event is triggered, then the second select event will trigger another second time period timing procedure which can either be forward timing or backward timing as well. In other words, the second select event will trigger another control procedure 600. For example, the select events 464, 465, 466 will each initiate timing for a second time period. Though the second time periods initiated by the select events 464, 465, 466 do overlap, they do not affect each other. The directional event 432 is triggered within the second time periods corresponding to the select events 465, 466, thus the select events 465, 466 are disabled. The directional event 432 is not triggered within the second time period corresponding to the select events 464, thus the directional event 432 will not disable the select events 464. That is, no timing of a second time period initiated by a select event will be reset by another select event.

In another embodiment of the present invention, the first time period can be set zero. That is, a select event can only be disabled by a directional event triggered within a second time period corresponding to the select event, but cannot be disabled by a directional event triggered before the select event. Thus in this embodiment, steps 610, 615 can be eliminated. Therefore, it is within the scope of the present invention as long as a directional event triggered within a second time period after a select event is triggered is able to disable the select event. Whether a directional event triggered within a first time period before the select event is triggered is able to disable the select event or not does not affect the scope of the present invention.

In summary, when a directional event is triggered, all select events triggered within a second time period before the directional event is triggered and within a first time period after the directional event is triggered are disabled, thus preventing unwanted events accidentally triggered by a user. Although an unwanted event may occasionally be a directional event, the directional event is often not jeopardizing, and can be fixed by triggering an opposite directional event. But a select event is not so, a false trigger of the select event may cause a serious consequence. Therefore, an advantage of the present invention is to prevent triggering unwanted events.

The method of manipulating a joystick can be applied in many consumer electronic products such as a mobile communication apparatus, personal data assistant, vehicle navigator, MP3 walkman, and hand-held computer. The method can be applied to any joystick as long as the joystick can be depressed to trigger a select event. For example, the joystick can be a stiff joystick or a soft joystick. It can be a five way joystick for triggering four directional events and one select event, or a three way joystick for triggering two directional events and one select event. The two directional events can include an up event and a down event, or a left event and a right event.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a joystick comprising:
   when a first select event is triggered, starting to time a predetermined time period; and
   preventing the first select event from being executed and enabling a directional event when the directional event is triggered within the predetermined time period after the first select event is triggered.

2. The method of claim 1 wherein starting to time the predetermined time period comprises starting to time the predetermined time period backwards.

3. The method of claim 1 further comprising when a second select event is triggered within the predetermined time period, then starting to time another predetermined time period.

4. The method of claim 3 wherein starting to time another predetermined time period comprises starting to time another predetermined time period backwards.

5. The method of claim 1 wherein the joystick is capable of triggering four directional events and one select event.

6. The method of claim 1 wherein the joystick is capable of triggering two directional events and one select event.

* * * * *